United States Patent [19]
Presz, Jr. et al.

[11] Patent Number: 5,884,472
[45] Date of Patent: Mar. 23, 1999

[54] ALTERNATING LOBED MIXER/EJECTOR CONCEPT SUPPRESSOR

[75] Inventors: Walter M. Presz, Jr., Wilbraham; Gary Reynolds, Westfield, both of Mass.

[73] Assignee: Stage III Technologies, L.C., Las Vegas, Nev.

[21] Appl. No.: 18,428

[22] Filed: Feb. 4, 1998

Related U.S. Application Data

[63] Continuation-in-part of Ser. No. 729,571, Oct. 11, 1996, Pat. No. 5,761,900.

[60] Provisional application No. 60/063,581, Oct. 30, 1997 and provisional application No. 60/005,437, Oct. 11, 1995.

[51] Int. Cl.$^6$ ................................. F02K 1/38; F02K 3/02
[52] U.S. Cl. .................... 60/262; 60/271; 239/265.17; 239/265.37
[58] Field of Search .................................... 60/262, 226.2, 60/271; 239/265.17, 265.37, 265.19, 265.33

[56] References Cited

U.S. PATENT DOCUMENTS

| | | |
|---|---|---|
| 3,020,712 | 2/1962 | Dolliver . |
| 3,113,428 | 12/1963 | Colley et al. . |
| 3,174,282 | 3/1965 | Harrison . |
| 3,333,772 | 8/1967 | Bruner . |
| 3,463,402 | 8/1969 | Langston, Jr. . |
| 3,568,794 | 3/1971 | Hilbig . |
| 3,579,993 | 5/1971 | Tanner et al. . |
| 3,613,826 | 10/1971 | Cabassut . |
| 3,673,803 | 7/1972 | MacDonald . |
| 3,696,617 | 10/1972 | Ellis . |
| 3,749,316 | 7/1973 | Tontini . |
| 3,889,882 | 6/1975 | Hull, Jr. et al. . |
| 3,910,375 | 10/1975 | Hache et al. . |
| 3,927,522 | 12/1975 | Bryce et al. . |
| 3,990,530 | 11/1976 | Helfich et al. . |
| 4,077,206 | 3/1978 | Ayyagari . |
| 4,117,671 | 10/1978 | Neal et al. . |
| 4,291,782 | 9/1981 | Klees . |
| 4,302,934 | 12/1981 | Wynosky et al. . |
| 4,353,516 | 10/1982 | Soligny et al. . |
| 4,422,524 | 12/1983 | Osborn . |
| 4,487,017 | 12/1984 | Rodgers . |
| 4,501,393 | 2/1985 | Klees et al. . |
| 4,543,784 | 10/1985 | Kirker . |

(List continued on next page.)

FOREIGN PATENT DOCUMENTS

| | | |
|---|---|---|
| 1176983 | 12/1958 | France . |
| 836175 | 5/1958 | United Kingdom . |
| 1170809 | 9/1967 | United Kingdom . |

*Primary Examiner*—Charles G. Freay
*Attorney, Agent, or Firm*—Donald S. Holland, Esq.; Holland & Bonzagni, P.C.

[57] ABSTRACT

A mixer/ejector suppressor is disclosed for reducing the noise level created by the exhaust flows in gas turbines. In the preferred embodiment, the suppressor comprises a mixing ring of alternating lobes attached to the engine's tailpipe; an ejector shroud mounted onto the mixing ring; and a plurality of arcuate gaps, between the mixing ring and ejector shroud, that permit ambient air to be entrained into the shroud. The preferred mixing ring has ten curved lobes of alternating designs. Five of the mixing lobes are shallow, with contours similar to those of mixing lobes in an earlier TSMEC version, disclosed in a related U.S. utility patent application, Ser. No. 08/729,571. The other five lobes are much longer, and they are designed to penetrate deeply into the engine's hot core flow. Together, the ten lobes rapidly mix (mostly at supersonic conditions) the engine exhaust flows with secondary ambient air inside the shroud. The lobes thereby increase the spread rate of the exhaust jet, dissipate its velocity and greatly decrease the core length of the exhaust jet. Hence, noise levels are reduced, which enable older engines to meet new federal noise regulations, known as "Stage 3", at static and takeoff conditions. This suppressor, known as the "ALMEC," comprises an improvement in noise reduction over the prior TSMEC version.

9 Claims, 7 Drawing Sheets

U.S. PATENT DOCUMENTS

| | | |
|---|---|---|
| 4,548,034 | 10/1985 | Maguire . |
| 4,576,002 | 3/1986 | Mayrocostas . |
| 4,835,961 | 6/1989 | Presz, Jr. et al. . |
| 4,909,346 | 3/1990 | Torkelson . |
| 4,934,481 | 6/1990 | Friedrich . |
| 5,060,471 | 10/1991 | Torkelson ................................. 60/262 |
| 5,127,602 | 7/1992 | Batey et al. . |
| 5,157,916 | 10/1992 | Wynosky et al. . |
| 5,216,879 | 6/1993 | Zysmaan . |
| 5,291,672 | 3/1994 | Brown . |
| 5,440,875 | 8/1995 | Torkelson et al. . |
| 5,755,092 | 5/1998 | Dessale et al. ........................... 60/262 |
| 5,775,095 | 7/1998 | Zysman et al. ........................... 60/204 |

ALTERNATING LOBED MIXER/EJECTOR CONCEPT SUPPRESSOR

BACKGROUND OF THE INVENTION

This "regular" or utility patent application is a continuation-in-part of a "provisional" patent application, Ser. No. 60/063,581, filed Oct. 30, 1997. It is also a continuation-in-part of a utility patent application, Ser. No. 08/729,571, filed Oct. 11, 1996, now U.S. Pat. No. 5,761,900, which was a continuation-in-part of another provisional patent application, Ser. No. 60/005,437, filed Oct. 11, 1995.

This invention relates to jet aircraft. More particularly, it deals with noise suppressors that are attached to the aircraft's gas-turbine engines.

Jet noise is created by the exhaust gases, that emanate from the rear of a modern gas turbine. These exhaust gases are typically a mixture of two sources-the hot gasses resulting from the burnt fuel within the turbine's core flow and cooler air discharged from fan bypass ducts. In low bypass ratio jet engines, the gases usually mix before they exit the engine nozzle, where they form a high-speed plume. The plume rips or shears against the slower ambient air, as it rushes by.

While the shearing creates noise, it has been recognized that the dominant factor in the overall noise level is the speed of the hot core flow. Jet noise is a factor of the core speed to the seventh power. For example, if the core speed could be cut in half, the noise would be reduced to $\frac{1}{128}$ of its prior level.

Several methods have been utilized in the past to decrease the speed of the core flow, and hence lower the noise or decibel levels caused by the craft. For example, U.S. Pat. No. 4,835,961 to Walter M. Presz, Jr. et al. discloses an ejector mounted at the exit of a gas turbine. Ambient air is drawn, through an annular gap, into the ejector by entrainment. A ring of mixing lobes mixes air downstream with the turbine's exhaust plume, inside the ejector. This results in lower velocities, and lower jet noise levels.

The problem with conventional ejectors is that they perform well below ideal predictions. The key factor is jet mixing. A jet normally mixes with a spread angle of about five degrees. Long mixing ducts, with the length-to-diameter ratios ("L/D") greater than ten, are required to obtain complete mixing. These long ducts result in large friction losses and poor ejector performance. The long ducts also result in large weight increases, and poor cruise performance.

Applicant has compiled baseline data for conventional ejectors. That data shows that short ejector ducts result in virtually no mixing, and poor pumping results. Long duct lengths are required for reasonable flow mixing. The long ducts result in large wall friction losses, and again poor pumping performance. A means of increasing mixing rates without large losses is needed to improve ejector performance.

New stringent federal noise regulations (i.e., "Stage 3") will soon prohibit most older aircraft from landing in suburban airports. These older aircraft are usually powered by low bypass ratio turbofan engines. Such engines have extremely high jet velocities, with relatively high jet noise. However, their noise levels have been governed by more lenient regulations, known as "Stage 2".

In order for such older engines to meet the new noise standards, conventional ejectors would have to be lengthened. That would increase the overall weight of the engine, and might even make some of the older aircraft unflyable.

Newer jet engines have high bypass ratios. This means that they have much larger fan flows, and overall larger total engine flow rates. A large fraction of the energy obtained through burning fuel in the core system is used to drive a fan and pump more flow. Thrust is obtained through larger mass flow rates, and lower jet velocities. This results in much lower jet noise levels.

Accordingly, it is a primary object of the present invention to provide an improved mixer/ejector system that decreases the noise levels of older engines, within a short ejector shroud, to meet the new Stage 3 noise regulations.

It is another object of the present invention to provide a mixer/ejector system with stator vanes or lobes that are specifically designed to rapidly mix ambient air with the engine exhaust gases, thereby shortening the length required to obtain the desired mixing It is another object to provide an improved mixer/ejector system with a single ring of mixing lobes that provide a more rapid mixture than the combined effect of the two rings of mixing lobes found in related application Ser. No. 08/729,571.

It is a further object to provide a mixer/ejector suppressor, commensurate with the above-listed objects, that will increase the engine's effective thrust.

The above and other objects will become more readily apparent when the following descriptions are read in conjunction with the accompanying drawings.

SUMMARY OF THE INVENTION

An alternating lobed mixer/ejector concept (nicknamed "ALMEC") suppressor is disclosed for greatly reducing the noise level of gas turbines. In the preferred embodiment, the ALMEC suppressor includes: a mixing ring of curved stator vanes or lobes attached to the engine tailpipe; an ejector shroud, mounted onto the mixing ring, which extends downstream; and a plurality of gaps, circumferentially located between the mixing ring and ejector shroud, that permit ambient air to be sucked into the shroud.

The preferred mixing ring has ten lobes designed to efficiently and rapidly (mostly at supersonic conditions) mix the engine exhaust flows with ejector secondary air (i.e., ambient air). Five of the mixing lobes are shallow, with contours extremely similar to those of the primary mixing lobes disclosed in the related U.S. utility patent application, "TWO STAGE MIXER EJECTOR SUPPRESSOR" (a.k.a. "TSMEC"), filed on Oct. 11, 1996 and accorded Ser. No. 08/729,571. The other five lobes are much longer, and are designed to penetrate deeply into the engines's hot core flow. The shallow and deep lobes alternate around the circumference of the nozzle.

The ALMEC provides improved performance over the prior TSMEC version for some aircraft applications. Its alternating lobes allow deep penetration of the core flow-the main cause of jet noise-without setting up large flow losses. They increase the spread rate of the exhaust jet, dissipate its velocity and greatly decrease the core length of the exhaust jet. Hence, noise levels are reduced, to meet Stage III requirements, at static and takeoff conditions.

BRIEF DESCRIPTION OF THE DRAWINGS

FIGS. 15A–N depict the contours of the FIG. 13 lobe pair taken along the planes referenced in FIG. 14.

DETAILED DESCRIPTION OF THE PREFERRED EMBODIMENT

The present invention concerns an alternating lobed mixer/ejector concept for suppressing the noise from jet aircraft. This suppressor is marketed under the trademark "ALMEC" by the Assignee, Stage III Technologies, L.C., of La Jolla, Calif.

The ALMEC suppressor comprises an improvement over the two-stage mixer/ejector concept ("TSMEC") described in a related utility patent application, "TWO-STAGE MIXER EJECTOR SUPPRESSOR", filed Oct. 11, 1996 and accorded Ser. No. 08/729,571. Many of the structural features and explanations in that earlier application apply to this improvement. That application (Ser. No. 08/729,571) is hereby incorporated by reference, but also partially described below for easy cross-referencing by a reader.

FIGS. 1–9 of the present application duplicate FIGS. 1–9 from Ser. No. 08/729,571. They illustrate a preferred TSMEC suppressor. FIGS. 10–15 herein illustrate a preferred ALMEC suppressor. After describing the TSMEC below, Applicant will describe the ALMEC by pointing out the differences that make it the improved "next generation".

Prior TSMEC Suppressor

Referring to FIGS. 1–9 in detail, a TSMEC suppressor is generally designated by the reference number 10.

Though the TSMEC invention is designed to work with all modern gas turbines, the illustrated embodiment 10 is shown attached to a SPEY 511-8 turbojet engine 12. The SPEY 511-8 includes: a bypass duct 14; and a central core flow 16 in which the engine fuel is burnt. The bypass air is bled off the compressor prior to combustion. Flow streams from the bypass duct 14 and central core 16 mix slightly, forming exhaust streams. The exhaust streams then exit the rear of the turbofan 12. There, they pass through the TSMEC 10.

In the preferred embodiment, the TSMEC 10 comprises a combined engine tailpipe and lobed nozzle 18 attached to the rear of the turbofan 12; a tubular ejector shroud 20 attached to the engine nozzle 18, where it straddles the nozzle's exit end; first and second lobe mixer stages 22, 24 within the engine nozzle 18 and shroud 20; a ring 26 of arcuate gaps (e.g, 26a) preceding the ejector shroud 20; and a primary ring 30 of identical convergent/divergent stationary nozzles or mixing lobes (e.g., 30a), ending inside the first ejector stage 22, that direct entrained ambient air at supersonic speed to a complementary second ring 32 of convergent/divergent mixer lobes (e.g., 32a) inside the second ejector stage 24.

The TSMEC exhaust suppressor 10 was designed to be the same length as prior Stage II suppressors, or shorter. It can be attached to the rear of turbofan 12 by any suitable means, such as welding of a annular flange 34 (see FIG. 2). The shroud 20 contains a standard support ring 36, found on prior Stage II shrouds, for structural stability.

Immediately downstream of support ring 36 is the primary nozzle ring 30. It is attached to the interior wall of the shroud by any suitable means, such as welding.

Though not shown in its entirety (for the sake of simplicity), the primary nozzle ring 30 consists of ten canted, convergent/divergent ("CD") lobes. One representative primary lobe is, however, shown at 30a in FIGS. 4, 5 and 6A–6H. Each primary lobe's angles (i.e., with respect to the horizontal direction) on the secondary flow side (i.e., the lobe side toward the centerline of the nozzle that carries the cool fan air) should be between fifteen degrees and fortyfive degrees. This assures penetration of the cool secondary flow (i.e., fan air) into the hot primary flow (i.e., exhaust core flow) near the nozzle centerline. The lobe angles on the primary flow side (i.e., the lobe side toward the shroud that carries the hot core flow 16) should be between five degrees and fifteen degrees. These lower angles minimize the thrust loss due to flow divergents. These profile guidelines assure very little extra surface area when compared to that of a conventional round nozzle. The lobed nozzle exit plane should be cut back at an angle between five degrees and twenty degrees. This cut-back provides an aerodynamic CD lobed nozzle for the flow to locally expand supersonically to the shroud pressure. Most of this expansion will occur as the flow exits the lobe. In this manner, the high velocity expanded core flow will mix quickly with fan air, reducing any overexpansion outside the primary nozzle ring.

The ejector shroud 20 is extremely short, as a result of new ejector performance. It should have a length-to-diameter ratio (i.e., L/D) of between one-quarter and one, and should operate at a pumping rate near eighty percent of ideal. The shroud trailing edge also is flush with the trailing edge of a ten lobed forced mixer, i.e., the secondary mixer lobe ring 32 mentioned above. These secondary lobes are identical, with one representative lobe being shown at 32a in FIGS. 7, 8 and 9A–9F. Their job is to quickly mix the previously combined streams of core and fan flows with ambient entrained air (sucked in through arcuate gaps such as 26a), at supersonic speed, prior to the streams discharging from the shroud.

Figure 1:
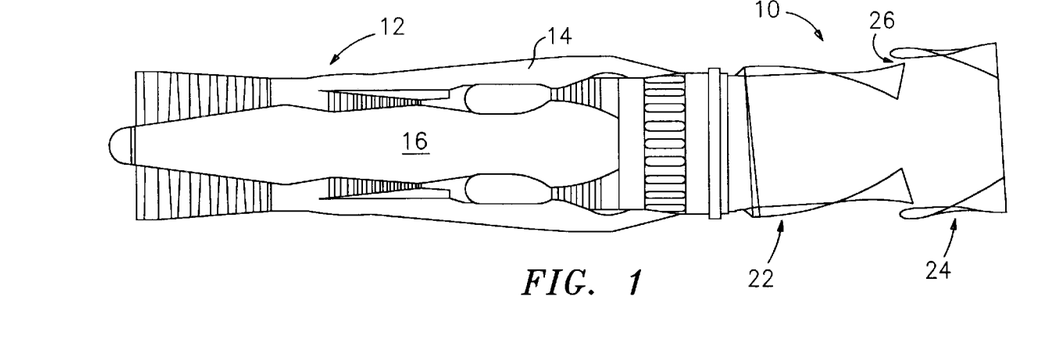
FIG. 1 is a side-elevational view of a two-stage mixer/ejector concept ("TSMEC"), previously disclosed in application Ser. No. 08/729,571.
Figure 2:
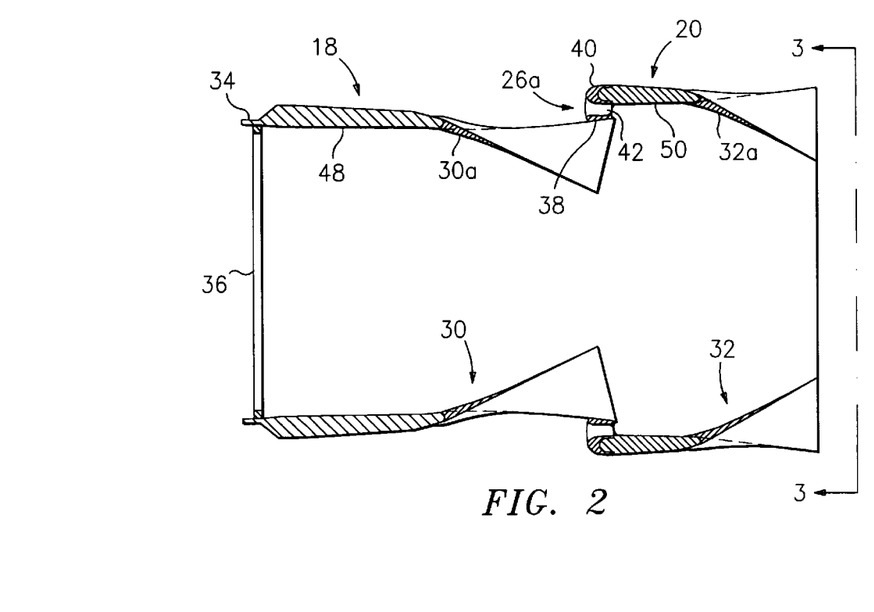
FIG. 2 is an enlarged view of the TSMEC, shown in FIG. 1.
Figure 3:
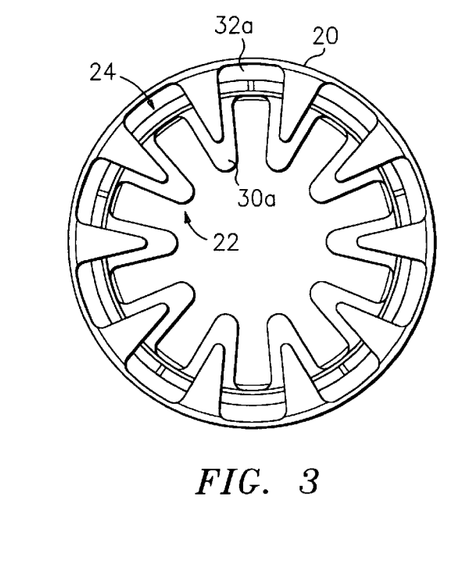
FIG. 3 is a rear-end plan view, taken along line 3—3 of FIG. 2.

As best shown in FIGS. 2 and 3, the second lobe ring 32 is located radially outwardly from the centerline of the primary nozzle ring 30. The second ring is supported in this position by: a lower or foot ring 38; an upper ring 40; and a series of spaced struts 42 that define the gaps (e.g., 26) for sucking in ambient air.

From the above-listed information, routineers should realize that the primary and secondary lobed nozzles (e.g., 30*a*, 32*a*) were designed in a similar fashion to form a supersonic two-stage mixer system. The two lobe rings 30, 32 were specifically designed to complement each other in rapidly mixing ambient air with the engine exhaust gases. The primary ring 30 mixes the flows within its lobes while directing both: hot and high velocity air out toward the shroud walls, and cold and low velocity air toward the shroud centerline. This phenomenon has been measured on recent model tests of similar lobes. The lobes (e.g., 30*a*, 32*a*) are designed to rapidly mix the high velocity flow near the shroud wall with ambient air. These same lobes will increase the mixing of the exhaust jet, create an outer doughnut-like jacket around the core to produce a less turbulent flow, and greatly decrease the core length of the exhaust jet.

Figure 4:
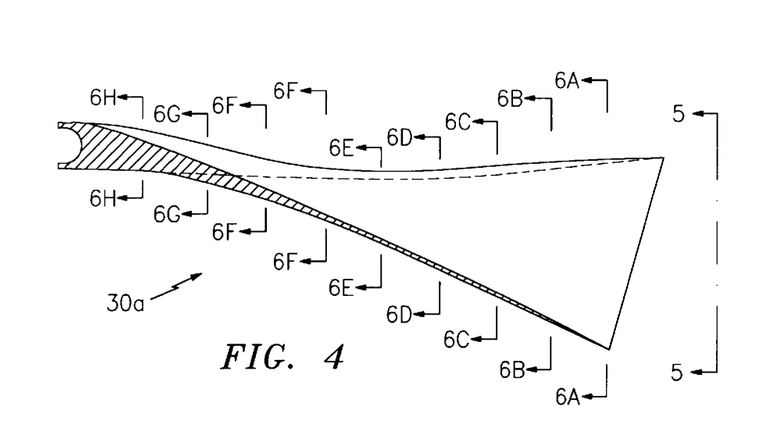
FIG. 4 shows a representative lobe in a primary stator ring of a first stage in the TSMEC.
Figure 5:
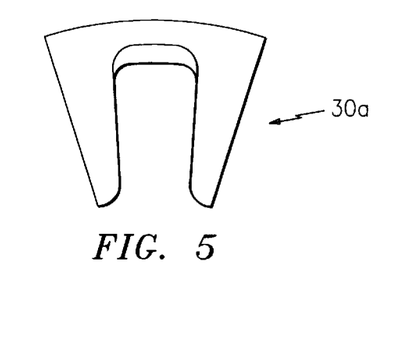
FIG. 5 is an end plan view of the FIG. 4 lobe, taken along line 5—5.
Figures 6A, 6E:
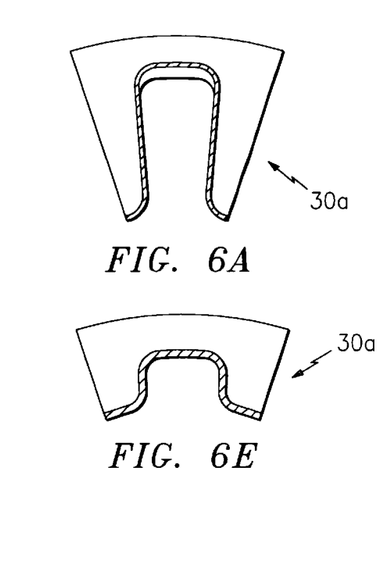
FIGS. 6A–6H are various cross-sectional views of the FIG. 4 lobe.
Figures 6B, 6F:
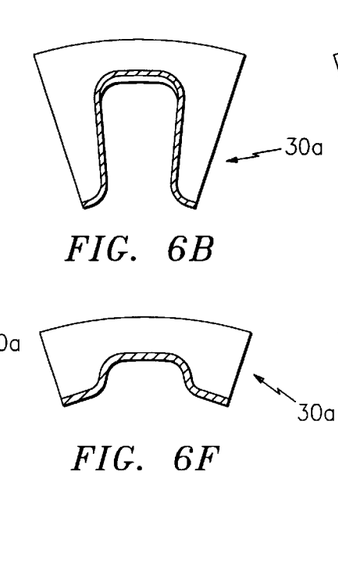
Figures 6C, 6D, 6G, 6H:
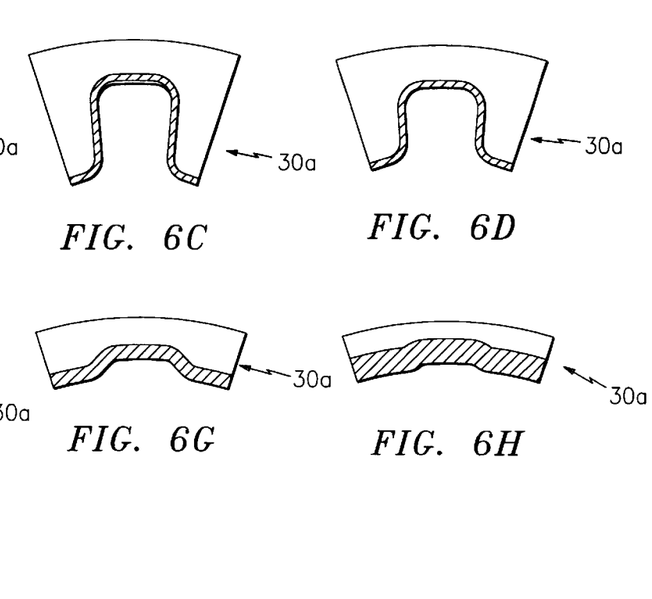
Figure 7:
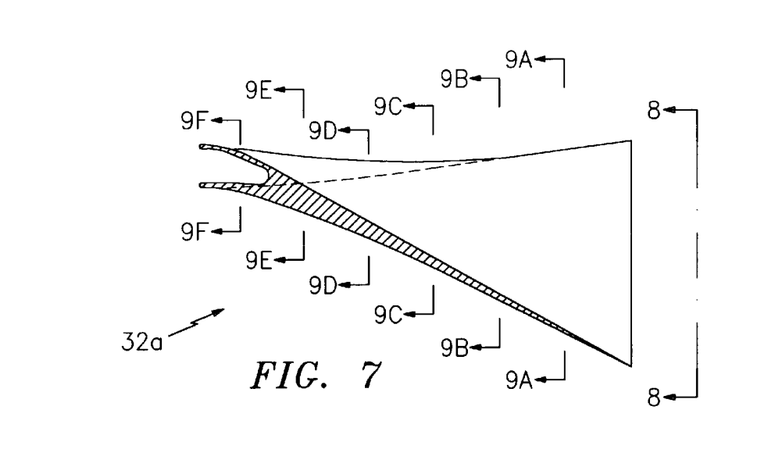
FIG. 7 shows one of the lobes in a secondary stator ring of a second stage in the TSMEC.
Figure 8:
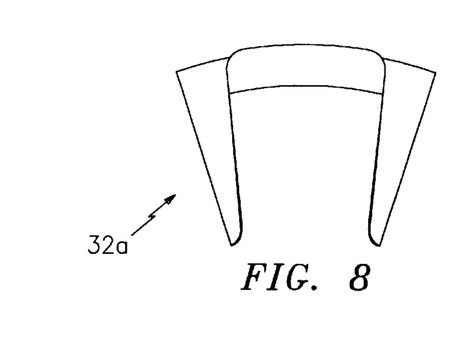
FIG. 8 is an end plan view of the FIG. 7 lobe taken along line 8—8.
Figure 9A:
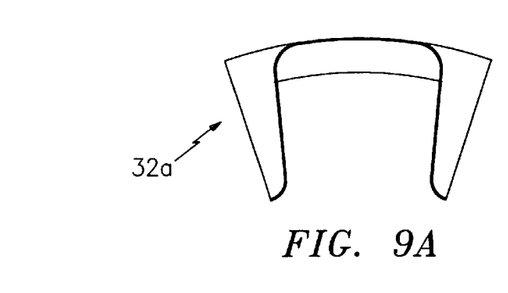
FIGS. 9A–9F show various cross-sectional views of the FIG. 7 lobe.
Figure 9B:
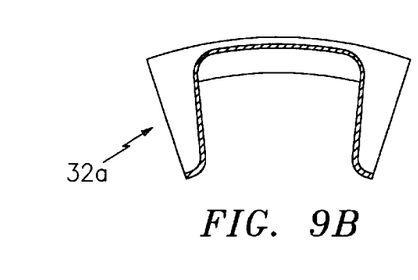
Figure 9C:
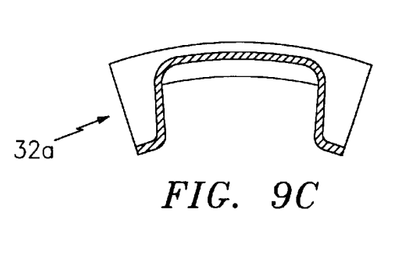
Figure 9D:
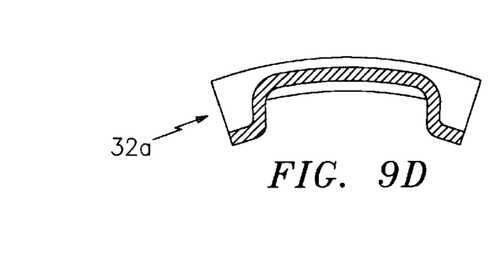
Figure 9E:
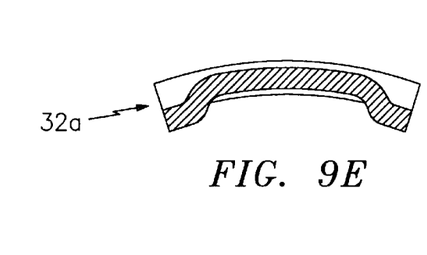
Figure 9F:
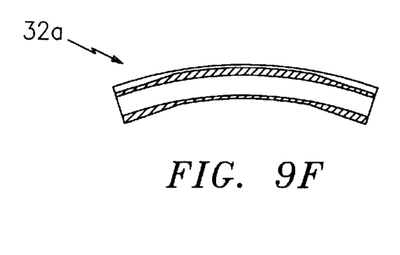

The engine nozzle 18 and shroud 20 can both start with sheet metal portions 48, 50 with acoustical linings. As best shown in FIGS. 2, 4, and 7, the lobe rings 30, 32 can be separately made of sheet metal and attached to the portions 48, 50.

In short, the TSMEC suppressor system 10 will pull in ambient air, rapidly mix the ambient air with engine gases, increase the exhaust jet spread rate and dramatically reduce exhaust jet noise.

New ALMEC Suppressor

Engine tests with the TSMEC suppressor 10 verified the desired acoustical and performance benefits of the TSMEC design on the SPEY 511. However, nozzle lobe variations conducted during the same engine tests demonstrated that alternating deep penetrating lobes (on the primary lobe ring 30) could decrease jet noise much more than the original TSMEC suppressor 10. Therefore, the TSMEC suppressor design was modified to include alternating, deep penetrating nozzle lobes. The secondary lobe ring 32, found in the TSMEC embodiment above, was also eliminated. In addition, the ejector shroud 20 was lengthened to allow more room for acoustical lining to absorb high frequency noise, generated by the added deeper nozzles. The resulting ALMEC suppressor was further designed and analyzed, resulting in preferred embodiment 100 shown in FIGS. 10–15.

Like elements occur in FIGS. 1–9 and 10–15. Where that occurs, reference numbers are replicated in FIGS. 10–15, but preceded by the digit 100. For example, the discharge 18 (i.e., the tailpipe of the SPEY 511 gas turbine), shown in FIG. 2, is labeled 118 in FIG. 10. Similarly, the ALMEC ejector shroud is labeled 120, even though its length is longer than its TSMEC counterpart 20.

Referring to FIGS. 10–15 in detail, the preferred ALMEC suppressor 100 has two major components or stages: a mixing ring 130 of alternating stator vanes or lobes (e.g., 130*a*, 130*b*) attached to the engine tailpipe 118; and the ejector shroud 120, mounted atop the lobe ring 130, with arcuate gaps (located circumferentially) between the shroud 120 and lobe ring 130. Like their TSMEC counterparts (i.e., the lobes of primary nozzle ring 30). the ALMEC lobes (e.g., 130*a*, 130*b*) are specially designed to mix the exhaust flow with entrained ambient air, mostly at supersonic speeds, within the ejector shroud 120.

As best shown in FIGS. 10–13, mixing ring 130 (a.k.a the "engine nozzle") preferably has ten curved lobes. Five of the lobes (e.g., 130*a*) are shallow; and they are designed to be substantially identical to the lobed (e.g., 30*a*) TSMEC ring 30 (see FIGS. 4, 5 and 6A–6H). The ALMEC's other five lobes (e.g., 130*b*) are much longer; and they are designed to penetrate deeply into the hot engine core flow. Both lobes (e.g., 130*a*, 130*b*) are designed to generate large scale, mixing vortices. The shallow and deep lobes alternate around the circumference of the nozzle 130 (see FIGS. 11 and 12).

Test data shows that the alternating lobes (e.g., 130*a*, 130*b*) allow deep penetration of the jet core, without setting up large flow losses due to flow channeling. The alternating lobes also set up separate axial vorticity patterns that interact with each other to enhance mixing.

Figure 10:
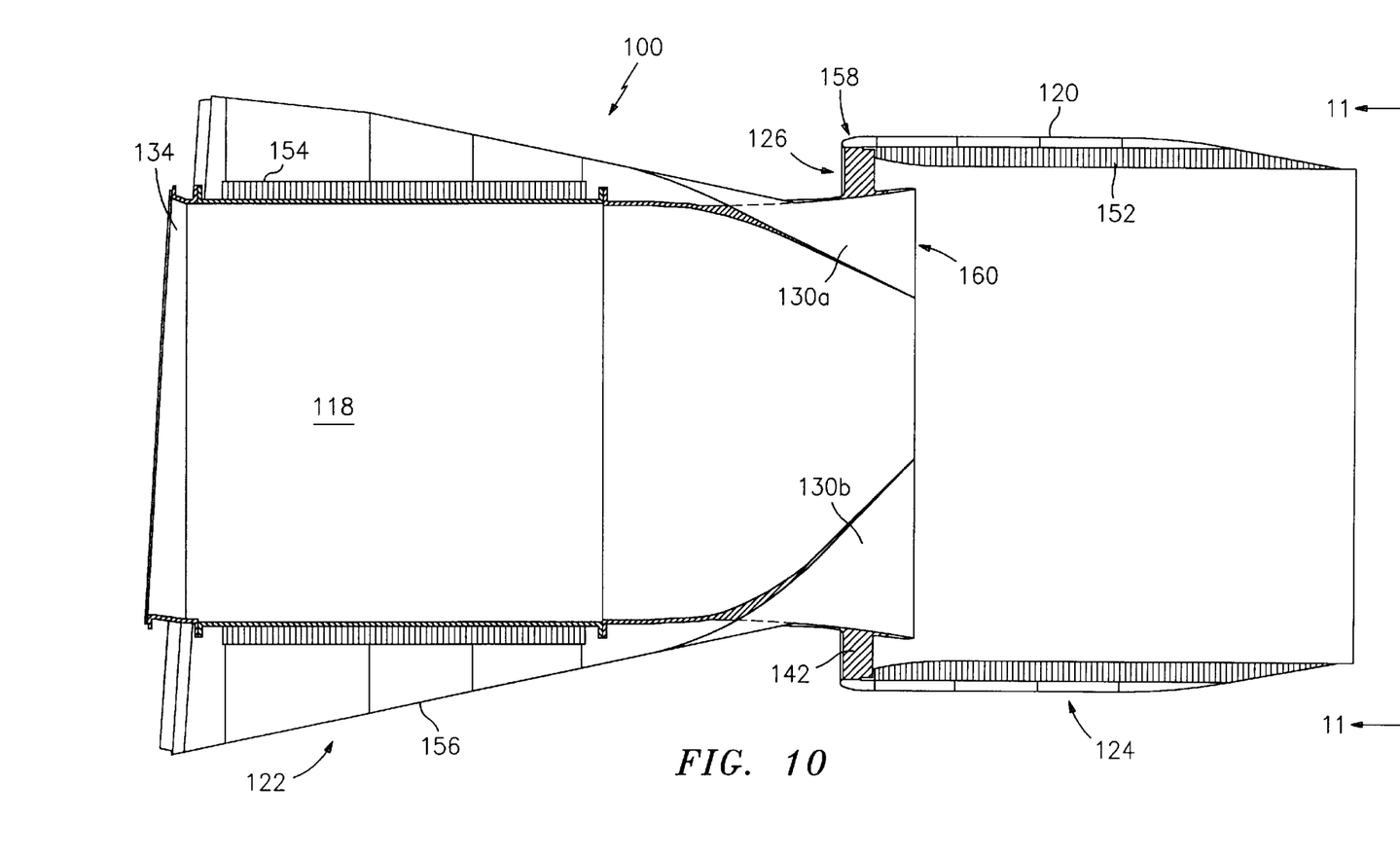
FIG. 10 is a side-elevational view of a new and improved mixer/ejector system (compared to the TSMEC suppressor of FIGS. 1–9), utilizing an alternating lobed mixer/ejector concept ("ALMEC")
Figure 11:
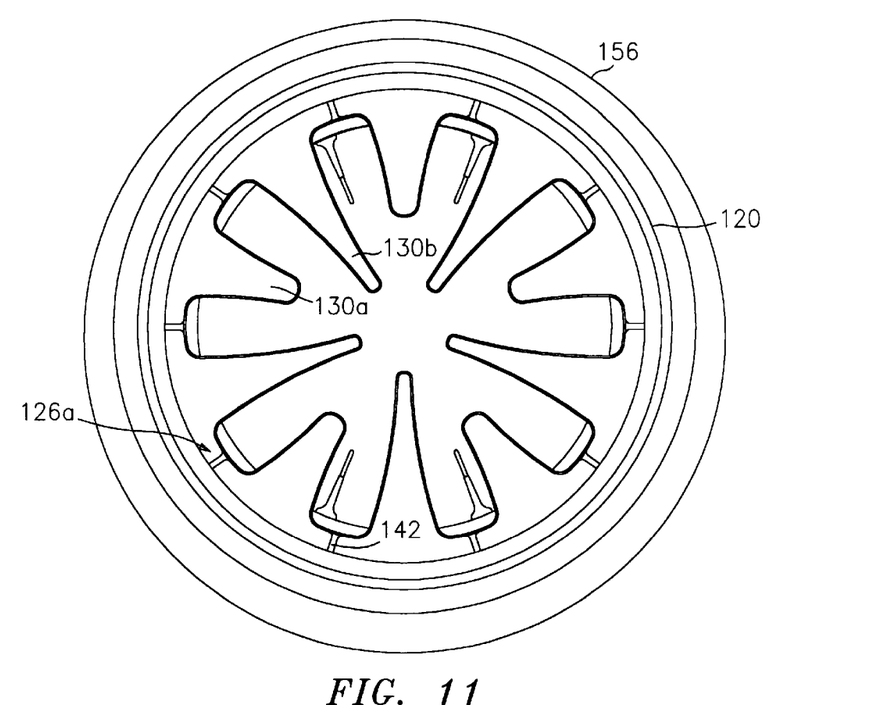
FIG. 11 is a rear plan view, taken along line 10—10 of FIG. 10.

Referring to FIGS. 10 and 11, the ejector shroud 120 is attached to the engine nozzle lobes (e.g., 130*a*, 130*b*) by ten spaced pylons or struts (e.g., 142). The ten separate pylons span the gaps (e.g., 126*a*) used for sucking in ambient air, just like in the TSMEC version.

The inner surface of ejector shroud 120 is treated with acoustical lining 152, as shown in FIG. 10. That is because the alternating mixer lobes break the nozzle exit planes into small channels. These small channels, especially those created by the deeper lobes (e.g., 130*b*), result in high frequency jet noise generation. The shroud acoustical lining 152 is designed to absorb that high frequency noise.

Similarly, there is acoustical lining 154 between the tailpipe 118 (through which the exhausts flow) and an outer covering or fairing 156. It too absorbs some noise.

The ejector shroud 120 has a length-to-diameter of about one. This provides good mixing without large wall friction losses and larger weight.

The ratio of the shroud area to the nozzle exit area is about one. This area ratio provides enough secondary flow pumping to meet Stage 3 noise requirements at static and takeoff conditions, but minimizes the cruise drag losses associated with the ejector secondary flow, near the ring 126 of gaps.

The shroud inlet 158 is designed to provide a continuously accelerating flow from the shroud secondary flow entrance to the nozzle lobe exit plane (at 160). The secondary inlet duct area is a minimum at the lobe exit plane. This assures that any choking of the secondary flow occurs at, or after the lobe exit plane. The axial placement of the secondary inlet entrance (i.e., the leading "edge" of gap ring 126), with respect to the nozzle exit plane, is designed to assure the secondary flow follows the aggressive lobe lines. That results in optimum mixing with minimal drag losses.

Figure 14:
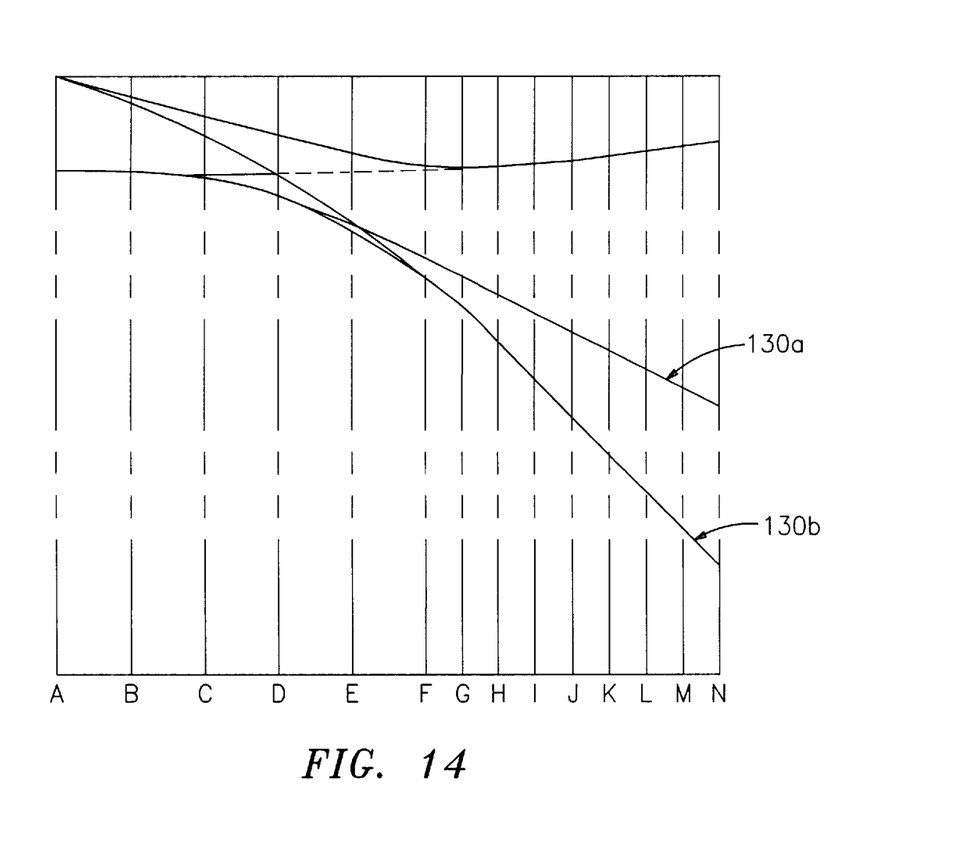
FIG. 14 is a chart of various cross-sections or planes taken along the shallow-and deep-lobe pair depicted in FIG. 13.
Figures 15A, 15F, 15K:
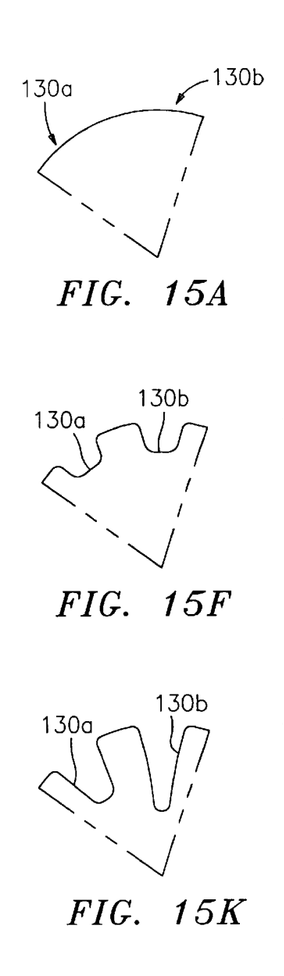
Figure 15B:
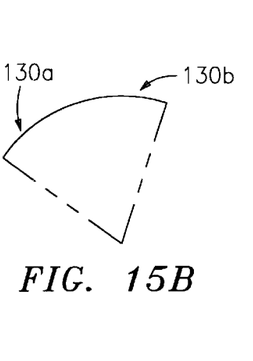
Figure 15C:
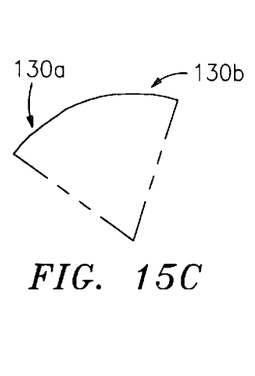
Figure 15D:
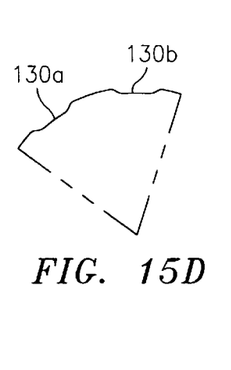
Figure 15E:
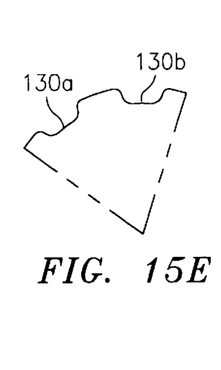
Figures 15G, 15L:
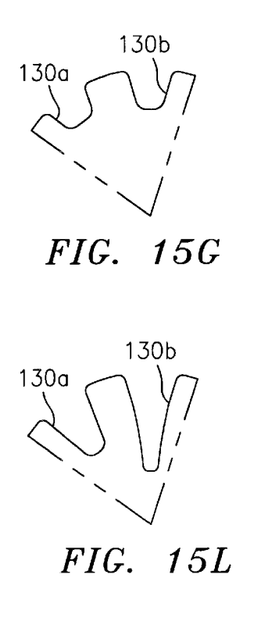
Figures 15H, 15M:
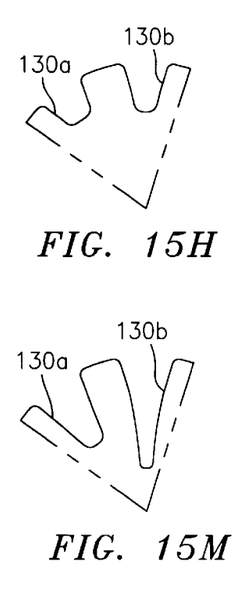
Figures 15I, 15N:
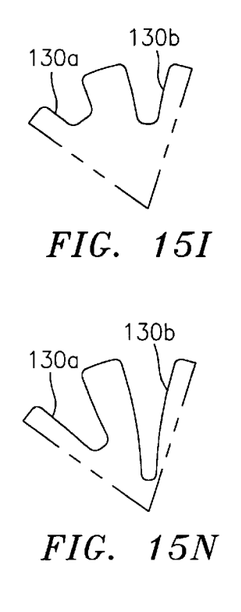
Figure 15J:
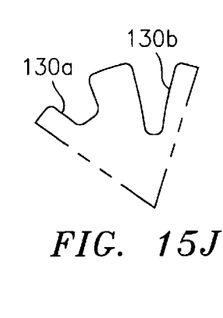

FIGS. 14 and 15A–N together depict the contours of adjacent pairs of the ALMEC's shallow and deeper lobes (e.g., 130*a*, 130*b*). FIG. 14 is a chart of various axial locations A–N along the sample pair of lobes depicted in FIG. 13. A–F occur every two inches, while G–N occur at one-inch intervals. FIGS. 15A–N depict the lobe contours, of the sample pair, at those planes.

Figure 12:
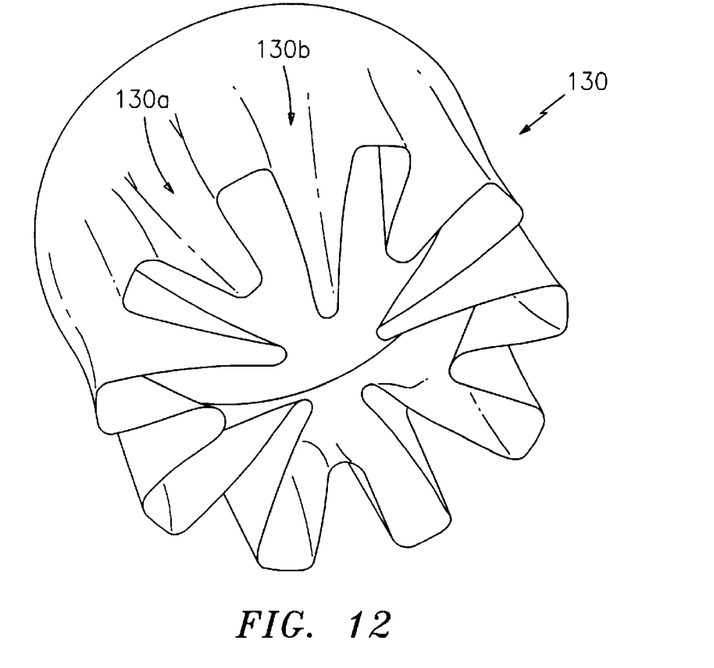
FIG. 12 is a rear perspective view of a lobed nozzle in the ALMEC suppressor, containing alternating shallow and deep lobes.
Figure 13:
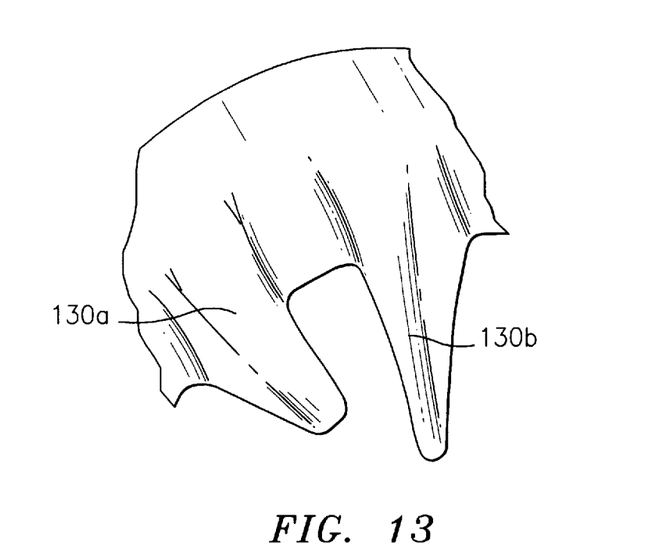
FIG. 13 shows a representation pair of contiguous shallow and deep lobes from FIG. 12.

In other words, lobe cross sections are presented at various axial locations along the exhaust system central line. The cross sections show the detailed development of one repeating, compound lobe geometry contained in a pair of deep (130*b*) and shallow (130*a*) lobe surfaces. FIG. 12 presents a service model of the entire lobed nozzle 130; and it is helpful when interpreting FIGS. 13, 14 and 15A–N.

FIGS. 14 and 15A–N show the separate development of the representative shallow lobe 130*a* and the deep penetrating lobe (e.g., 130*b*) contours. The shallow lobe contours are very similar to those of lobes (e.g., 30*a*) in the TSMEC embodiment, as defined above. The ALMEC's deep penetrating lobes are seen to have more aggressive turning angles than the shallow, TSMEC lobes. These larger turning angles result in more rapid mixing. These deeper lobes also penetrate much further into the hot jet core. Alternating lobes (e.g., 130a, 130b) of nozzle ring 130 assure minimum flow blockage and losses.

The transition from the right cylindrical tailpipe or round nacelle section 118 to the outer lobe surfaces of nozzle 130 is accomplished by using the aerodynamic fairing 156 (see FIG. 2). This fairing is designed to be continuous in curvature to assure smooth flow accelerations from the round nacelle surface to the onset of the lobe surfaces. Furthermore, fairing 156 minimizes the losses associated with horseshoe vortex formation at the onset of the lobes.

Shallow lobes (e.g., 130a) differ from their TSMEC counterparts (e.g., 30a) by virtue of some blending required to smoothen the transition between their contours and the more aggressive contours of the ALMEC's deeper lobes (e.g., 130b). Also, their exit planes differ from the canted exit planes of those TSMEC lobes.

The exit planes of the ALMEC's alternating nozzles, as best shown in FIG. 10, are vertical or perpendicular to the nozzle center line. They are all located in a single, common plane (at 160). This minimizes the jet velocities over the trailing edge surfaces for a choked nozzle 130. A choked nozzle is a nozzle operating at high pressure ratios which cause sonic velocities to occur at the minimum flow area within the nozzle. Canting the exit plane causes the minimum area to occur before the exit; and it causes supersonic flow to occur over portions of the lobe trailing edge surface. Designing the lobed nozzle 130 to have a vertical exit plane (at 160) with a continuously decreasing area causes the minimum area to occur at the exit plane of the nozzle. Downstream of the exit plane 160, supersonic flow results. This design results in lower velocities over the trailing edge surfaces for a choked nozzle.

If more mixing is required, or if the nozzle is not choked, the lobe nozzle exit planes for the ALMEC can be cut back to generate an effective convergent-divergent region open to the secondary flow (i.e., similar to the TSMFC design). This convergent-divergent region can provide more rapid mixing of the engine jet with secondary flow. It can be used where high Mach numbers are less of a concern, or where more rapid mixing is required.

It should be readily understood by those skilled in the art that obvious structural modifications can be made to the illustrated ALMEC embodiment without departing from the spirit of the invention. For example, an additional "supersonic" lobe ring could be added inside an elongated ejector if further noise suppression were desired. Accordingly, reference should be made to the accompanying claims, rather than the foregoing specification, to determine the scope of the invention.

Having thus described the invention, what is claimed is:

1. In a gas turbine of the type having engine exhaust gases that can create jet noise, the improvement comprising a multi-stage mixer/ejector suppressor that reduces the jet noise, said suppressor comprising:
   a. a first stage having a tailpipe attached to an exhaust end of the turbine;
   b. a second stage having a tubular ejector shroud, attached downstream to a discharge end of the first stage, wherein the shroud straddles the first stage's discharge end with arcuate gaps between the shroud and the discharge end; and
   c. supersonic mixing means to mix the engine exhaust gases, at supersonic flow speeds, with cooler ambient air pulled in through the gaps, to increase spread rate of the exhaust gases, to dissipate velocity of the exhaust gasses, and to decrease core length of an exhaust jet, compared to the spread rate, velocity and core length previously associated with the gas turbine without the multi-stage mixer, thereby reducing noise levels previously associated with the gas turbine without the multi-stage mixer, prior to the exhaust gases exiting the shroud, said means comprising:
      (i) a stator ring of curved lobes that forms part of the first stage, said ring having a leading edge attached to the tailpipe and a portion that extends inside the shroud;
      (ii) wherein the stator ring is comprised of alternating lobe designs, with alternating lobes being identical and being sandwiched between lobes that are identical to each other but of a different design then the lobe between them; and
      (iii) wherein half of the stator ring's lobes extend deeper, than the remaining lobes in the stator ring, into the exhaust gases, relative to a center line of the gases.

2. The suppressor of claim 1 wherein a plurality of the lobes have perpendicular trailing edges relative to the center line of the exhaust gases.

3. The suppressor of claim 1 wherein all of the lobes have perpendicular trailing edges relative to the center line of the exhaust gases.

4. The suppressor of claim 3 wherein all of the lobes' trailing perpendicular edges lie in a common plane.

5. In a gas turbine of the type having engine exhaust gases that can create jet noise, the improvement comprising a multi-stage mixer/ejector suppressor that reduces the jet noise, said suppressor comprising:
   a. a first stage having a tailpipe attached to an exhaust end of the turbine;
   b. a second stage having a tubular ejector shroud, attached downstream to a discharge end of the first stage, wherein the shroud straddles the first stage's discharge end with arcuate gaps between the shroud and the discharge end; and
   c. supersonic mixing means to mix the engine exhaust gases, at supersonic flow speeds, with cooler ambient air pulled in through the gaps, to increase spread rate of the exhaust gases, to dissipate velocity of the exhaust gasses, and to decrease core length of an exhaust jet, compared to the spread rate, velocity and core length previously associated with the gas turbine without the multi-stage mixer, thereby reducing noise levels previously associated with the gas turbine without the multi-stage mixer, prior to the exhaust gases exiting the shroud, said means comprising:
      (i) a stator ring of curved lobes that forms part of the first stage, said ring having a leading edge attached to the tailpipe and a trailing edge that extends inside the shroud;
      (ii) wherein the stator ring is comprised of a plurality of different lobe designs; and
      (iii) wherein some of the lobes extend deeper than the remaining lobes in the stator ring, into the exhaust gases, relative to a center line of the gases.

6. The suppressor of claim 5 wherein a plurality of the lobes have perpendicular trailing edges relative to the center line of the exhaust gases.

7. The suppressor of claim 5 wherein all of the lobes have perpendicular trailing edges relative to the center line of the exhaust gases.

8. The suppressor of claim 6 wherein all of the lobes' trailing perpendicular edges lie in a common plane.

9. A mixer for suppressing noise created by exhaust gases discharged from a gas turbine, the mixer comprising:
   a. at least one annular mixer stage that is adapted to be attached to a discharge end of the turbine; and
   b. supersonic means to mix the engine exhaust gases, at supersonic flow speeds, with cooler ambient air to increase spread rate of exhaust gases, to dissipate velocity of the exhaust gases, and to decrease core length of an exhaust jet, compared to the spread rate, velocity and core length previously associated with the gas turbine without the mixer, thereby reducing noise levels previously associated with the gas turbine without the mixer, prior to the exhaust gases exiting the mixer stage, said means comprising a stator ring of curved lobes, within the mixer stage, to achieve the supersonic mixing.

* * * * *

UNITED STATES PATENT AND TRADEMARK OFFICE
CERTIFICATE OF CORRECTION

PATENT NO. : 5,884,472
DATED : March 23, 1999
INVENTOR(S) : Walter M. Presz, Jr. et al.

It is certified that error appears in the above-identified patent and that said Letters Patent is hereby corrected as shown below:

Column 7, line 41, of the Patent, delete "TSMFC" and insert --TSMEC--.

Signed and Sealed this

Thirty-first Day of August, 1999

Attest:

Q. TODD DICKINSON

*Attesting Officer*  *Acting Commissioner of Patents and Trademarks*